United States Patent
Bharghavan et al.

(10) Patent No.: US 10,769,613 B1
(45) Date of Patent: Sep. 8, 2020

(54) DELEGATE CARDS

(71) Applicant: Ondot Systems Inc, San Jose, CA (US)

(72) Inventors: Vaduvur Bharghavan, Morgan Hill, CA (US); Aurovinda Gangam, Santa Clara, CA (US)

(73) Assignee: ONDOT SYSTEMS, INC, Santa Clara, CA (US)

( * ) Notice: Subject to any disclaimer, the term of this patent is extended or adjusted under 35 U.S.C. 154(b) by 1012 days.

(21) Appl. No.: 14/743,999

(22) Filed: Jun. 18, 2015

Related U.S. Application Data

(63) Continuation-in-part of application No. 14/060,439, filed on Oct. 22, 2013, now Pat. No. 10,043,182, and a continuation-in-part of application No. 14/685,574, filed on Apr. 13, 2015.

(60) Provisional application No. 62/014,098, filed on Jun. 18, 2014.

(51) Int. Cl.
*G06Q 20/22* (2012.01)
*G06Q 20/40* (2012.01)

(52) U.S. Cl.
CPC ......... *G06Q 20/229* (2020.05); *G06Q 20/409* (2013.01)

(58) Field of Classification Search
CPC ........ G06Q 10/00; G06Q 20/00; G06Q 30/00; G06Q 40/00
USPC ...................................................... 705/3–44
See application file for complete search history.

(56) References Cited

U.S. PATENT DOCUMENTS

| | | | |
|---|---|---|---|
| 5,708,422 A | 1/1998 | Blonder | |
| 5,884,289 A | 3/1999 | Anderson | |
| 5,892,900 A | 4/1999 | Ginter et al. | |
| 5,953,710 A | 9/1999 | Fleming | |
| 6,029,154 A | 2/2000 | Pettitt | |
| 6,122,624 A | 9/2000 | Tetro | |
| 6,343,279 B1 | 1/2002 | Bissonette | |
| 6,422,462 B1 | 7/2002 | Cohen | |
| 6,505,168 B1 | 1/2003 | Rothman et al. | |
| 6,516,056 B1 | 2/2003 | Justice | |
| 7,427,033 B1 | 9/2008 | Roskind | |
| 7,707,105 B2 * | 4/2010 | O'Neil | G06Q 20/10 705/35 |
| 7,784,684 B2 | 8/2010 | Labrou et al. | |
| 7,793,851 B2 | 9/2010 | Mullen | |
| 7,798,416 B2 | 9/2010 | Roskind | |

(Continued)

OTHER PUBLICATIONS

Ian C. Povey, "Assessing the impact of EMV migration: A pragmatic delivery approach", Journal of Payments Strategy & Systems vol. 2, No. 4, Jun. 24 . (Year: 2008).*

(Continued)

*Primary Examiner* — Frantzy Poinvil
(74) *Attorney, Agent, or Firm* — Law Office of Dorian Cartwright; Dorian Cartwright

(57) ABSTRACT

A method for managing a payment card is disclosed. The method comprises allowing a first party with access rights to a payment card managed by a card management system to designate at least one second party to whom access rights to said payment card is to be granted; and allowing said at least on second party to have access rights to said payment card by said card management system; wherein a card issuer associated with the payment card is not aware of the existence of the at least one second party and hence cannot exert any control over the access rights of said at least one second party.

2 Claims, 12 Drawing Sheets

(56) References Cited

U.S. PATENT DOCUMENTS

| | | | |
|---|---|---|---|
| 7,801,826 B2 | 9/2010 | Labrou et al. | |
| 7,813,725 B2 | 10/2010 | Celik | |
| 7,822,688 B2 | 10/2010 | Labrou et al. | |
| 7,828,220 B2 | 11/2010 | Mullen | |
| 7,908,216 B1 | 3/2011 | Davis et al. | |
| 7,954,704 B1* | 6/2011 | Gephart | G06Q 20/3572 235/380 |
| 8,025,220 B2 | 9/2011 | Blume et al. | |
| 8,127,982 B1 | 3/2012 | Casey | |
| 8,131,860 B1 | 3/2012 | Wong et al. | |
| 8,191,778 B1* | 6/2012 | Hogg | G06Q 20/04 235/380 |
| 8,396,888 B2 | 3/2013 | Cheng et al. | |
| 8,413,896 B2* | 4/2013 | Hogg | G06Q 20/04 235/380 |
| 8,442,894 B2 | 5/2013 | Blackhurst et al. | |
| 8,540,150 B2* | 9/2013 | Hogg | G06Q 20/04 235/380 |
| 8,577,804 B1* | 11/2013 | Bacastow | G06Q 20/027 235/380 |
| 8,583,593 B1 | 11/2013 | Achanta | |
| 8,622,309 B1* | 1/2014 | Mullen | G06Q 20/347 235/492 |
| 8,690,055 B2* | 4/2014 | Anderson | G06K 19/06196 235/379 |
| 8,700,729 B2* | 4/2014 | Dua | G06Q 20/20 709/217 |
| 8,706,620 B2 | 4/2014 | Ciurea | |
| 8,788,324 B1 | 7/2014 | Shetty | |
| 8,818,909 B2 | 8/2014 | Bosworth et al. | |
| 9,324,105 B2* | 4/2016 | Kopikare | H04W 8/005 |
| 9,881,298 B2 | 1/2018 | Filtcroft et al. | |
| 9,881,299 B2 | 1/2018 | Isaacson et al. | |
| 2002/0035539 A1 | 3/2002 | O'Connell | |
| 2002/0082995 A1 | 6/2002 | Christie, IV | |
| 2002/0111886 A1 | 8/2002 | Chenevich et al. | |
| 2002/0120782 A1 | 8/2002 | Dillon et al. | |
| 2002/0123938 A1 | 9/2002 | Yu | |
| 2002/0152123 A1 | 10/2002 | Giordano et al. | |
| 2002/0194141 A1 | 12/2002 | Langensteiner | |
| 2002/0198806 A1 | 12/2002 | Blagg | |
| 2003/0028481 A1 | 2/2003 | Flitcroft | |
| 2003/0140007 A1* | 7/2003 | Kramer | G06Q 20/04 705/40 |
| 2004/0039694 A1 | 2/2004 | Dunn | |
| 2004/0068653 A1 | 4/2004 | Fascenda | |
| 2004/0093268 A1 | 5/2004 | Ramchandani et al. | |
| 2004/0128243 A1 | 7/2004 | Kavanagh | |
| 2005/0097019 A1 | 5/2005 | Jacobs | |
| 2005/0102243 A1 | 5/2005 | Kinsella | |
| 2005/0240527 A1 | 10/2005 | Goldman | |
| 2005/0268003 A1 | 12/2005 | Wang | |
| 2006/0085337 A1 | 4/2006 | Conforti et al. | |
| 2006/0178986 A1 | 8/2006 | Giordano et al. | |
| 2007/0039049 A1 | 2/2007 | Kupferman et al. | |
| 2007/0124256 A1 | 5/2007 | Crooks et al. | |
| 2007/0165572 A1 | 7/2007 | Lenzarini | |
| 2008/0035724 A1 | 2/2008 | Vawter | |
| 2008/0101283 A1 | 5/2008 | Calhoun et al. | |
| 2008/0120235 A1 | 5/2008 | Chu | |
| 2008/0133336 A1 | 6/2008 | Altman et al. | |
| 2008/0147523 A1 | 6/2008 | Mulry et al. | |
| 2008/0228648 A1 | 9/2008 | Kemper | |
| 2008/0257952 A1 | 10/2008 | Zandonadi | |
| 2008/0263402 A1 | 10/2008 | Braysy | |
| 2009/0112651 A1 | 4/2009 | Atkinson | |
| 2009/0132424 A1 | 5/2009 | Kendrick et al. | |
| 2009/0138968 A1 | 5/2009 | Serber | |
| 2009/0164327 A1 | 6/2009 | Bishop et al. | |
| 2009/0164330 A1 | 6/2009 | Bishop et al. | |
| 2009/0254462 A1 | 10/2009 | Tomchek et al. | |
| 2009/0313147 A1 | 12/2009 | Balasubramanian et al. | |
| 2010/0051684 A1 | 3/2010 | Powers | |
| 2010/0063903 A1 | 3/2010 | Whipple et al. | |
| 2010/0065632 A1 | 3/2010 | Babcock et al. | |
| 2010/0106611 A1 | 4/2010 | Paulsen | |
| 2010/0114776 A1 | 5/2010 | Weller et al. | |
| 2010/0153224 A1 | 6/2010 | Livnat | |
| 2010/0241563 A1* | 9/2010 | Waltman | G06Q 20/10 705/41 |
| 2010/0274720 A1 | 10/2010 | Carlson | |
| 2010/0325047 A1 | 12/2010 | Carlson et al. | |
| 2011/0066504 A1 | 3/2011 | Chatow et al. | |
| 2011/0137881 A1 | 6/2011 | Cheng et al. | |
| 2011/0164509 A1 | 7/2011 | Wengrovitz | |
| 2011/0231555 A1 | 9/2011 | Ebrahimi et al. | |
| 2011/0238564 A1 | 9/2011 | Lim et al. | |
| 2011/0251892 A1 | 10/2011 | Laracey | |
| 2012/0029999 A1* | 2/2012 | Hogg | G06Q 20/04 705/14.27 |
| 2012/0030109 A1 | 2/2012 | Dooley Maley | |
| 2012/0036013 A1 | 2/2012 | Neuhaus | |
| 2012/0059758 A1 | 3/2012 | Carlson | |
| 2012/0072347 A1 | 3/2012 | Conway | |
| 2012/0095918 A1 | 4/2012 | Jurss | |
| 2012/0143730 A1 | 6/2012 | Ansari et al. | |
| 2012/0197708 A1 | 8/2012 | Mullen et al. | |
| 2012/0197802 A1 | 8/2012 | Smith | |
| 2012/0225639 A1 | 9/2012 | Gazdzinski | |
| 2012/0233593 A1 | 9/2012 | Sahoo et al. | |
| 2012/0271697 A1 | 10/2012 | Gilman | |
| 2012/0303525 A1 | 11/2012 | Sahadevan | |
| 2013/0138516 A1 | 5/2013 | White | |
| 2013/0159121 A1* | 6/2013 | May | G06Q 30/06 705/26.1 |
| 2013/0254106 A1* | 9/2013 | Webber | G06Q 30/0601 705/41 |
| 2013/0282593 A1 | 10/2013 | Merz et al. | |
| 2013/0290121 A1 | 10/2013 | Simakov et al. | |
| 2013/0332361 A1 | 12/2013 | Ciurea | |
| 2013/0332362 A1 | 12/2013 | Ciurea | |
| 2013/0346294 A1 | 12/2013 | Faith | |
| 2014/0040135 A1 | 2/2014 | Ovick et al. | |
| 2014/0046838 A1* | 2/2014 | Dogin | G06Q 20/027 705/41 |
| 2014/0095947 A1 | 4/2014 | Mozak | |
| 2014/0144979 A1 | 5/2014 | Lyman et al. | |
| 2014/0258119 A1 | 9/2014 | Canis | |
| 2014/0304055 A1 | 10/2014 | Faith | |
| 2014/0358769 A1 | 12/2014 | Howe et al. | |
| 2014/0359052 A1 | 12/2014 | Joachimpillai et al. | |
| 2015/0095238 A1* | 4/2015 | Khan | G06Q 20/325 705/71 |
| 2015/0161587 A1* | 6/2015 | Khan | G06Q 20/3223 705/44 |
| 2015/0242949 A1 | 8/2015 | Phillips, IV | |
| 2015/0278809 A1 | 10/2015 | Deoliveria et al. | |
| 2017/0337546 A1* | 11/2017 | Holmes | G06Q 20/36 |

OTHER PUBLICATIONS

"Sniffing Tutorial part 1—intercepting Network Traffic", NETRESEC Network Security Blog. Web. , Mar. 11, 2011. http://www.netresec.com/?page=Blog&month=2011-03&post=Sniffing-Tutorial-part-1---Intercepting-Network-Traffic.

* cited by examiner

| Functionality | Primary User | Dependent User with Full Access | Dependent User with Restricted Access |
|---|---|---|---|
| | Using Card Credentials | Using One-Time Token | Using One-Time Token |
| Register Card | Y | Y | Y |
| Card Mask, Card Name, Expiration Date, Card Type, Card State | Y | Y | Y |
| Monthly Spend (actuals) | Y | Y | N |
| Debit: ATM Limit, POS Limit in Card Details Page | Y | Y | N |
| Credit: Current Balance in Card List Page | Y | Y | N |
| Credit: Current Balance, Available Credit, Available Cash, Credit Limit, Cash Limit in Card Details Page | Y | Y | Y |
| Control: On/Off/One-Time Use | Y | Y | Y |
| Control: My Location | Y | Y | N |
| All Other Controls: Transaction Type, Recurring Merchants, Merchant Type, Merchant Type Spend Limits, My Regions, International/Countries, Card Level Spend Limits, Time of Day | Y | Y | Y |
| All Alert Preferences | Y | Y | Y |
| Recent Transactions | Y | Y | Y |
| Linked Accounts: | Y | Y | N |

DELEGATE CARDS

This application is a continuation-in-part of U.S. patent application Ser. No. 14/060,439 filed Oct. 22, 2013, now U.S. Pat. No. 10,043,182 and entitled "SYSTEM AND METHOD FOR USING CARDHOLDER CONTEXT AND PREFERENCES IN TRANSACTION AUTHORIZATION", the specification of which is hereby incorporated herein by reference in its entirety.

This application is a continuation-in-part of U.S. patent application Ser. No. 14/685,574 filed Apr. 13, 2015 and entitled "TRANSACTION CONTROLS BITMAP IN PAYMENT CARD AUTHORIZATION", the specification of which is hereby incorporated herein by reference in its entirety.

This application also claims the benefit of priority to U.S. Provisional Patent Application No. 62/014,098 filed on Jun. 18, 12014 and entitled "DELEGATE CARD HOLDER".

FIELD

Embodiments of the invention relate generally to payment cards such as credit cards, debit cards, and the like.

BACKGROUND

Payment cards allow cardholders to make financial transactions without exchanging cash. A payment card is typically tied to an account, with an associated spending limit that is secured either by cardholder funds or by credit from a card-issuing financial institution.

In a typical payment card transaction, a cardholder presents the payment card information to a merchant (via a card reader or online), who then initiates a transaction authorization via the merchant's financial institution processor (i.e. acquirer processor) to the cardholder's financial institution processor (i.e. issuer processor).

The issuer processor conducts a series of checks that may include one or more of the following: validation of the transaction request format, validation of requesting merchant, fraud checks, compliance of the payment card with pre-defined card usage rules, and availability of funds in the cardholder's account. The examples above are neither comprehensive nor limiting. If all the checks pass satisfactorily, the issuer processor authorizes the transaction request. The transaction authorization allows the exchange of goods/services between the merchant and the cardholder to proceed, with the reconciliation and actual transfer of funds happening either concurrently, or at a later time. Card networks allow different acquirer and issuer processors to communicate with each other in "open loop" communications, while the acquirer and issuer processor either are typically the same or tied to each other via peer relationships in "closed loop" communications.

SUMMARY

This Summary is provided to comply with 37 C.F.R. § 1.73, requiring a summary of the invention briefly indicating the nature and substance of the invention. It is submitted with the understanding that it will not be used to interpret or limit the scope or meaning of the claims.

In one aspect, the invention discloses systems and methods for allowing cardholders to create primary/dependent relationships independently of a card issuer; and to share card management and visibility with others based on the relationships. Each primary/dependent relationships are referred to herein as "delegate relationship".

Cardholders register with their credentials on a card management system, configured to validate cards of each cardholder with card issuers. Upon validation for each card, the card management system may be configured to provide "delegate" card access to a "dependent user", who does not have or does not use card credentials and is thus not explicitly validated with the card issuer. The dependent user may be referred to herein as a "delegate".

Advantageously, the relationship between the "primary" and "dependent" is not based on records or relationships in the card issuer, but rather is based on the fact that a "primary" has "delegated" access for a card to the "dependent".

The "primary" user may delegate access to a "dependent" with "full access", i.e. wherein the dependent has the ability to fully manage the card including setting and changing usage preferences; or with "restricted access", i.e. wherein the dependent has the ability to only perform limited functions.

The "primary" user may revoke or change the capabilities for a "dependent" user at any time.

Other aspects of the invention will be apparent from the detailed description below.

BRIEF DESCRIPTION OF THE DRAWINGS

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form only in order to avoid obscuring the invention.

The present invention, in accordance with one or more various embodiments, is described in detail with reference to the following figures. The drawings are provided for purposes of illustration only and merely depict exemplary embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

FIG. 4 shows the access rights granted by the card management system for each user, in accordance with one embodiment.

FIG. 10 shows a user interface showing the controls that may be exercised relative to a payment card, in accordance with one embodiment.

Figure 1:
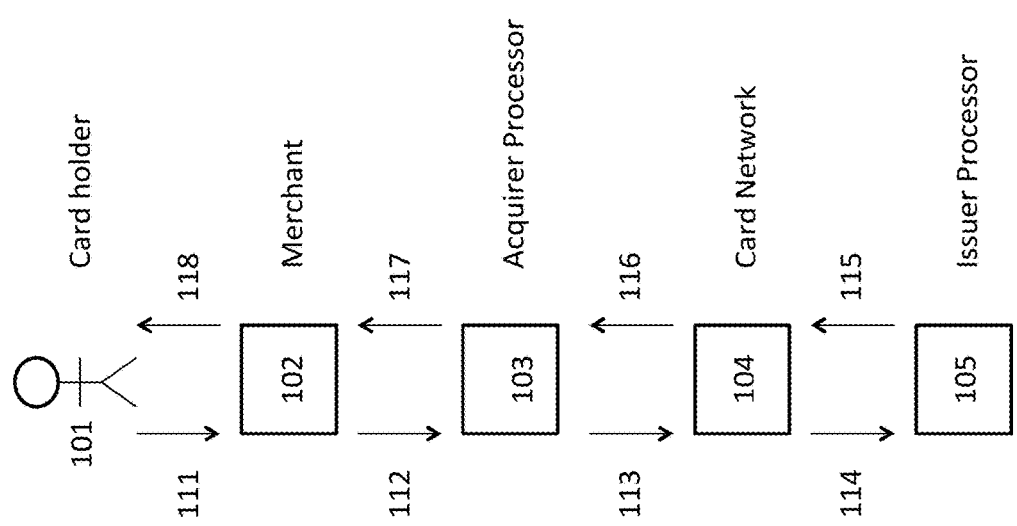
FIG. 1 is a diagram illustrating the existing method for payment card authorization.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form only in order to avoid obscuring the invention.

Reference in this specification to "one embodiment" or "an embodiment" means that a particular feature, structure, or characteristic described in connection with the embodiment is included in at least one embodiment of the invention. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Moreover, although the following description contains many specifics for the purposes of illustration, anyone skilled in the art will appreciate that many variations and/or alterations to said details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon, the invention.

Broadly, embodiments of the present invention are directed toward systems and methods for allowing cardholders to create primary/dependent relationships independently of a card issuer; and to share card management and visibility with others based on the relationships.

For example, a traveling professional may want to "delegate" card access to her secretary so that the secretary may view, manage, and reimburse all purchases made on the card. Further, if the traveling professional is stuck somewhere and is unable to change card preferences, the secretary may do it for her without having to call customer support. In this case, the card issuer has no knowledge or record of the secretary's credentials or even the existence of the delegate relationship between the cardholder and the assistant.

In another example, a mother may register her own card and her son's card, both of whom may be authorized under her credentials, and then "delegate" card access to her son. The mother may set some usage parameters including spend limits, and merchant categories where the son can spend. However, the son may have limited controls access, for example to turn off the card in case he loses it.

Figure 2:
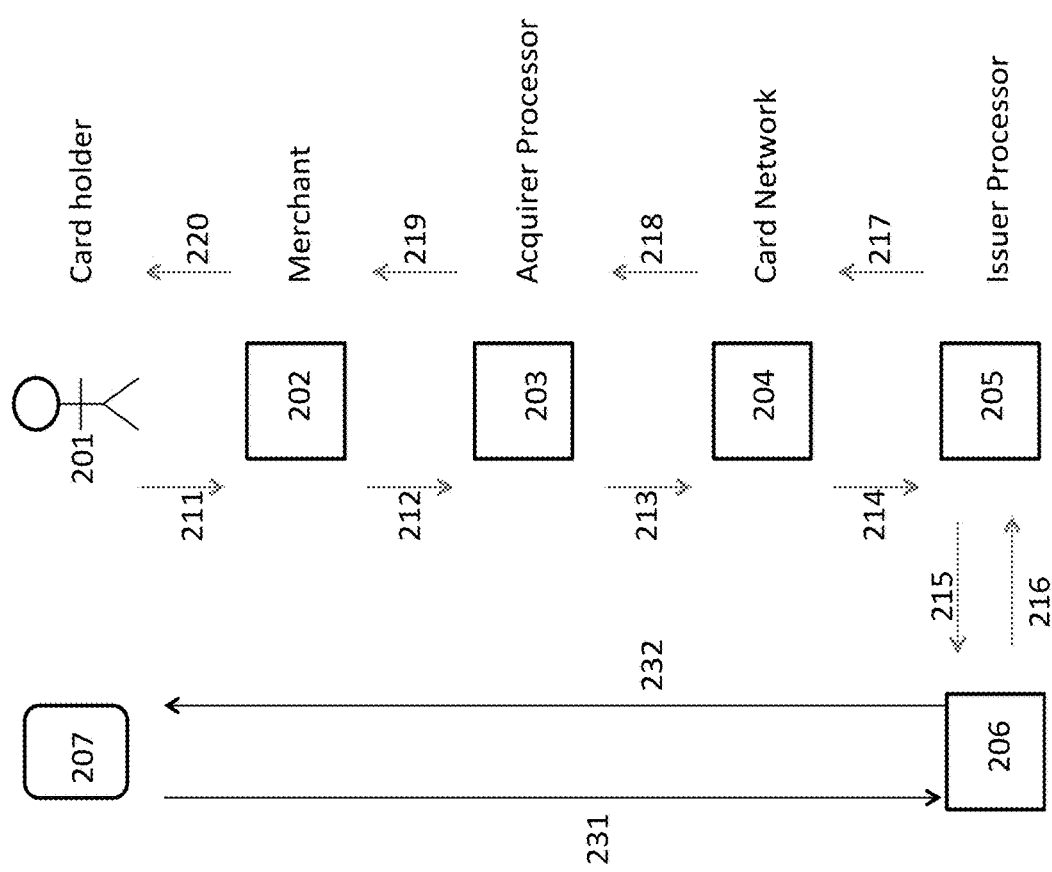
FIG. 2 is a diagram illustrating the injection of a computing server defining a card management system, in accordance with an embodiment of the invention.

Embodiments of the invention may be practiced with an open loop transaction processing system such as shown in FIG. 2 of the drawings. Referring to FIG. 1, there are at least five entities involved in such a transaction processing system: a cardholder 101 who presents the payment card credentials to make a purchase; a merchant 102 who accepts the payment card transaction in exchange of goods; a merchant or acquiring processor 103 that processes the payment transaction on behalf of the merchant; a card network 104 that connects the acquiring and issuing processors and validates the integrity of the transaction; and an issuer processor 105 that authorizes the transaction on behalf of the cardholder. Typically, the acquirer processor 103 generates the transaction authorization request and the issuer processor 105 authorizes or denies the transaction authorization request in its response.

There are typically, but not always, three separate phases in a payment card transaction: authorization, clearing, and settlement. These phases are presented as illustration and are not required to all be present for the invention.

Authorization is usually a real-time process, where a merchant gets authorization from the issuer processor for the transaction amount. Authorization may include an authorization message flow.

Clearing is either a real-time or offline process, where the merchant requests the actual transaction value (which may be lower than the authorization request) and the amounts are appropriately adjusted in the merchant and card holder's accounts.

Settlement is an after-the-fact process that involves the actual transfer of funds and allocation of fees to each of the parties involved in facilitating the transaction.

FIG. 1 shows an authorization message flow, in accordance with one embodiment of the invention. Referring to FIG. 1, the card holder 101 presents payment card credentials to a merchant 102, e.g. at the merchant's point of sale, for example by manual entry, or by card swipe in a card reader, or online entry, or a variety of other means. This step is indicated by the arrow 111.

The merchant 102 initiates an authorization request/handshake with the acquirer processor 103 as indicated by arrow 112. In one embodiment, the authorization request may be based on one of the existing standards for payment card processing (such as ISO 8583). In another embodiment, the authorization request may be based on a private application programming interface that is understood by the merchant point of sale and the acquirer processor 103.

The acquirer processor 103 initiates an authorization message (indicated by arrow 113) using a standard that is understood by the acquirer processor 103 and the card network 104, for example the ISO 8583 standard, which includes a x100 or a x200 message type, with the card number, card credentials, merchant information, transaction amount, and other mandatory and optional fields as required by the ISO 8583 standard.

The card network 104 does validity checks on the message, invokes any additional services that the acquirer or issuer have signed up for (such as address validation, pin validation, risk scoring, etc.), and then forwards (as indicated by arrow 114) the authorization message to the issuer processor 105.

The issuer processor 105 does validity checks on the message, invokes value-added services such as risk scoring, cardholder policy checks, etc., and checks if the card holder 101 has adequate funds to satisfy the transaction request. This step may require the issuer processor 105 to check its local databases or to initiate a real-time communication with the card holder's core banking system to obtain funds availability validation.

The issuer processor 105 responds to the transaction authorization message with a transaction authorization response message containing an approve/deny and a reason code. This step is indicated by the arrow 115 in FIG. 1.

The card network 104 forwards the transaction authorization response message to the acquirer processor 103 as indicated by the arrow 116.

The acquirer processor 103 completes the authorization handshake by sending the transaction authorization response message to the merchant 102 as indicated by the arrow 117.

The merchant 102 presents the transaction authorization response message to the card holder 101 as indicated by the arrow 118. Messages 111 to 118 in FIG. 1 define a transaction authorization path.

FIG. 1 shows a simple success case, and not the myriad complex use cases involving message loss, retries, timeouts, stand-in processing, etc.

Based on some embodiments of the ISO 8583 protocol, the transaction request message (x100 or x200) may include information required to determine a characterization of the transaction, including but not restricted to, the card number, transaction type (e.g. in-store, e-commerce, bill pay, mail order, etc.), merchant identifier, merchant type, merchant location, and transaction amount.

Based other embodiments of the ISO 8583 protocol, the transaction response message (x110 or x210) may include information required to complete a characterization of the transaction, including but not restricted to, the authorization status, the denial reason (if transaction is denied), the approval and approval amount.

FIG. 2 illustrates an authorization message flow, in accordance with another embodiment. The authorization message flow is similar to the authorization message flow of FIG. 1, save for an introduction of cardholder context and preferences into the transaction authorization process. Components 201-205 in FIG. 2 correspond to components 101-105 in FIG. 1.

Additionally, component 206 is a computing server that interfaces with the payment network on one side and a user device 207 on the other.

For illustrative purposes, computing server 206 is shown as interfacing with an issuer processor 205. However, those familiar with the art will recognize that computing server 206 could also interface with the card network 204 or even a financial institution, so long as it is in the transaction authorization path defined by messages 211, 212, 213, 214, 217, 218, 219, and 220, which correspond to messages 111 to 118 in FIG. 1.

Independent of the transaction authorization path defined by messages 211, 212, 213, 214, 217, 218, 219, and 220, the user device 207 and computing server 206 exchange information (231, 232), with the result that computing server 206 obtains cardholder contextual information and cardholder preferences. It will be apparent to one of ordinary skill in the art that user device 207 need not be bound to a specific user, nor does a specific user need to be bound to a user device 207. Further, while location context is used as an example of cardholder context, it will be apparent that this is illustrative and not limiting to the types of cardholder context that can be communicated between components 206 and 207.

During an authorization message flow, upon receipt of authorization message 214, in one embodiment of the invention, issuer processor 205 may retrieve cardholder context and payment card preferences from computing server 206, either for the purpose of affecting the outcome of the authorization or for additional information related to pre/in/or post transaction processing.

During an authorization message flow, upon receipt of authorization message 214, in another embodiment of the invention, issuer processor 205 may present the authorization message and receive the outcome of the application of cardholder context and user preferences on the authorization message 214 from computing server 206. This information may be used either for the purpose of affecting the outcome of the authorization or for additional information related to pre/in/or post transaction processing.

For the remainder of this description, the computing server 206 will be referred to as the card management system.

Figure 3:
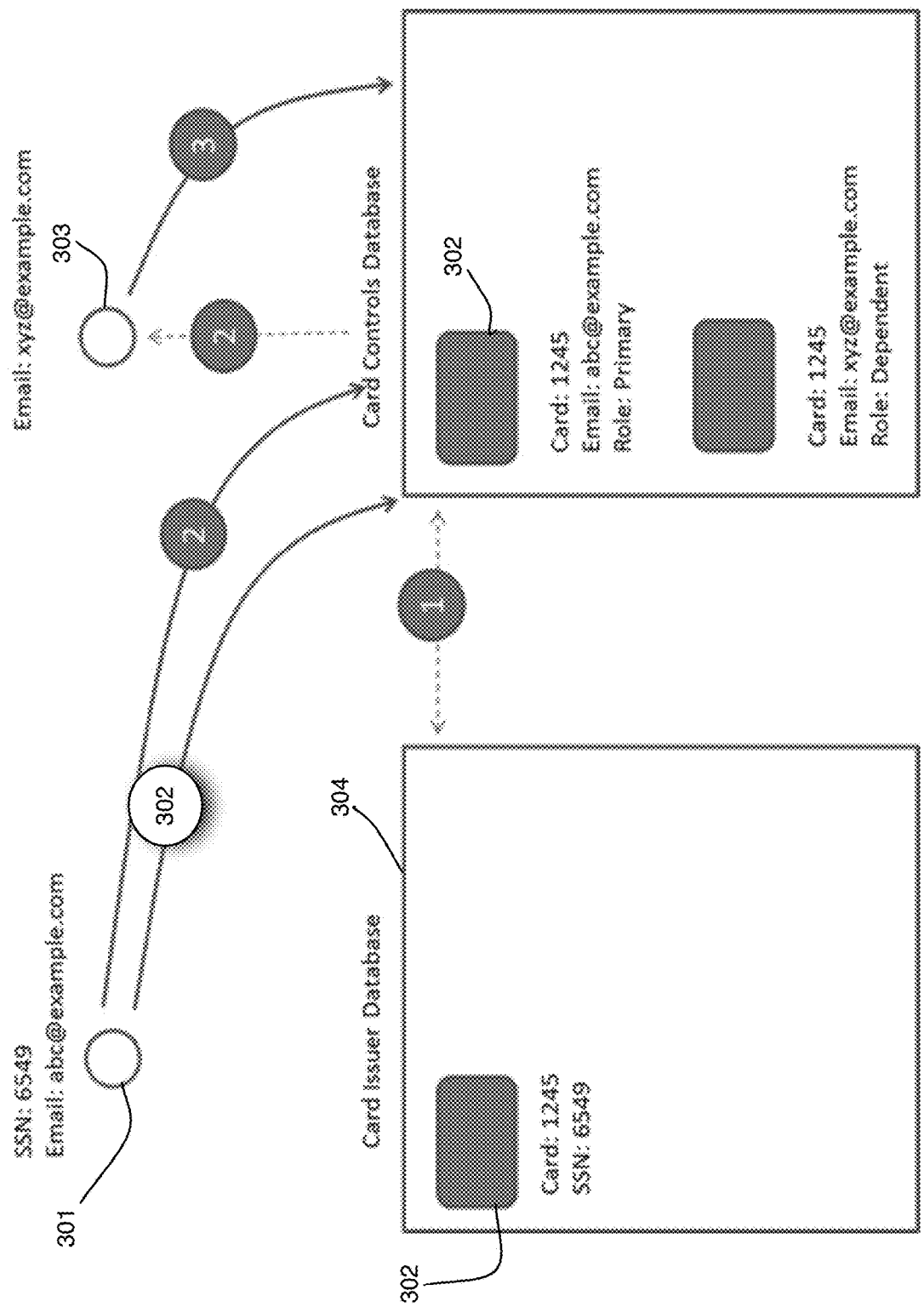
FIG. 3 illustrates the steps for creating a delegate relationship in accordance with one embodiment of the invention.

FIG. 3 illustrates the steps for creating a delegate relationship in accordance with one embodiment of the invention. Referring to FIG. 3, user 301 is a primary user for a card 302 the user 301 wished to grant delegate access to the card 302 to a user 303. For example, the user 301 may be a travelling professional and the user 303 may be a secretary of the user 301. In one embodiment, the user 301 registers the card 302 on a card control database which is a component of the card management system, as will described in greater detail later. The card management system may be configured to validate with card 302 against a card issuer database 304. In one embodiment, card issuer database 304 may be a component of the issuer processor 205.

In one embodiment, the card management system may be configured to allow the user 301 the ability to initiate a "delegate" request to the user 303. For example, the user 301 may then initiate a "delegate" request to by providing an email address to card management system, whereupon the card management system sends email invitation to the user 303. The delegate relationship is established when the user 303 registers as a delegate on the card management system using delegate invitation.

In one embodiment, a "primary user" is one who has the credentials for the card/cardholder to register or add a card, for example using the 2-factor authentication process. A primary user may be referred to herein as a "primary", In one embodiment, a "dependent user" is one who has been invited to manage the card, possibly creating a user account using the invitation, or adding a card to an existing account. A "dependent user" may be invited with "full access" or "limited access".

Typical functionality associated with a card includes viewing card details, setting card control preferences, setting card alert preferences, viewing and managing recent transactions, viewing linked accounts, performing funds transfer, and performing self service functions on a card. In one embodiment, the access rights may be controlled by the card management system disclosed herein based on controlling aspects of the aforementioned functionality. The particular techniques for control based on preferences is described in co-pending U.S. patent application Ser. No. 14/058,229 entitled "SYSTEM AND METHOD FOR AUTHORIZING A TRANSACTION BASED ON DYNAMIC LOCATION UPDATES FROM A USER DEVICE", filed on Oct. 19, 2013, and which is incorporated herein by reference.

In one embodiment, a primary user has access to all of the above functionality, and additionally has the ability to view all shared card users, change privileges of dependent card users, and invite dependents.

In one embodiment, a dependent user has access to some subset of the above functionality—card type, card state, card alert preferences, and recent transactions. A dependent user with "full access" additionally has the ability to set all control preferences, set all alert preferences, view linked accounts, perform account operations, and perform self-service functions. A dependent user with "restricted access" has the ability to only turn a card on or off, set "my location" control preference on if one of the primary users has already enabled "my location", set alert preferences, and perform non-privileged self-service functions. The table below shows the capabilities for each type of user.

FIG. 4 shows the access right for each user in accordance with one embodiment.

Registration Flow for Delegate Dependents

The following sequence illustrates a registration flow for a dependent delegate in accordance with one embodiment:

```
User opens up app on device
User enters card number
If error state for this card number is locked, message and exit
If error state for this card number is suspended,
   If suspend time has not expired, message and exit
   Else go through suspend flow and continue with registration process below
In there is a subscriber entry where registration is in progress the card number matches
entered card number
   if the primary device is different from current device, set the subscriber state to −1
If subscriber state for this <card number x device unique id> is NOT −1
   Continue from current state
Else
   If there is a pending delegate invitation for this card number
      Ask user if he has received an invitation by email and has a token (note
      that this message has to be clearly different from the 2FA token
      message)
         If yes
            Ask user to enter token (even if token has expired in the
            backend, since we want to let user know to ask for a
            new invitation
            User enters token
            If token matches
               Continue based on delegate state machine
            Else
               If token timeout,
                  Tell user that token invite has timed out,
                  and ask for another invitation to join
               Else
                  Increase error count in this state
                     If error count in this state has
                     exceeded the suspend or locked
                     threshold,
                        Delete the invitation
                        Message user that limit
                        of number of token
                        retries has exceeded,
                        and that primary needs
                        to resend invitation.
                     Else,
                        Tell user that token is
                        incorrect, try again
```

Figure 5:
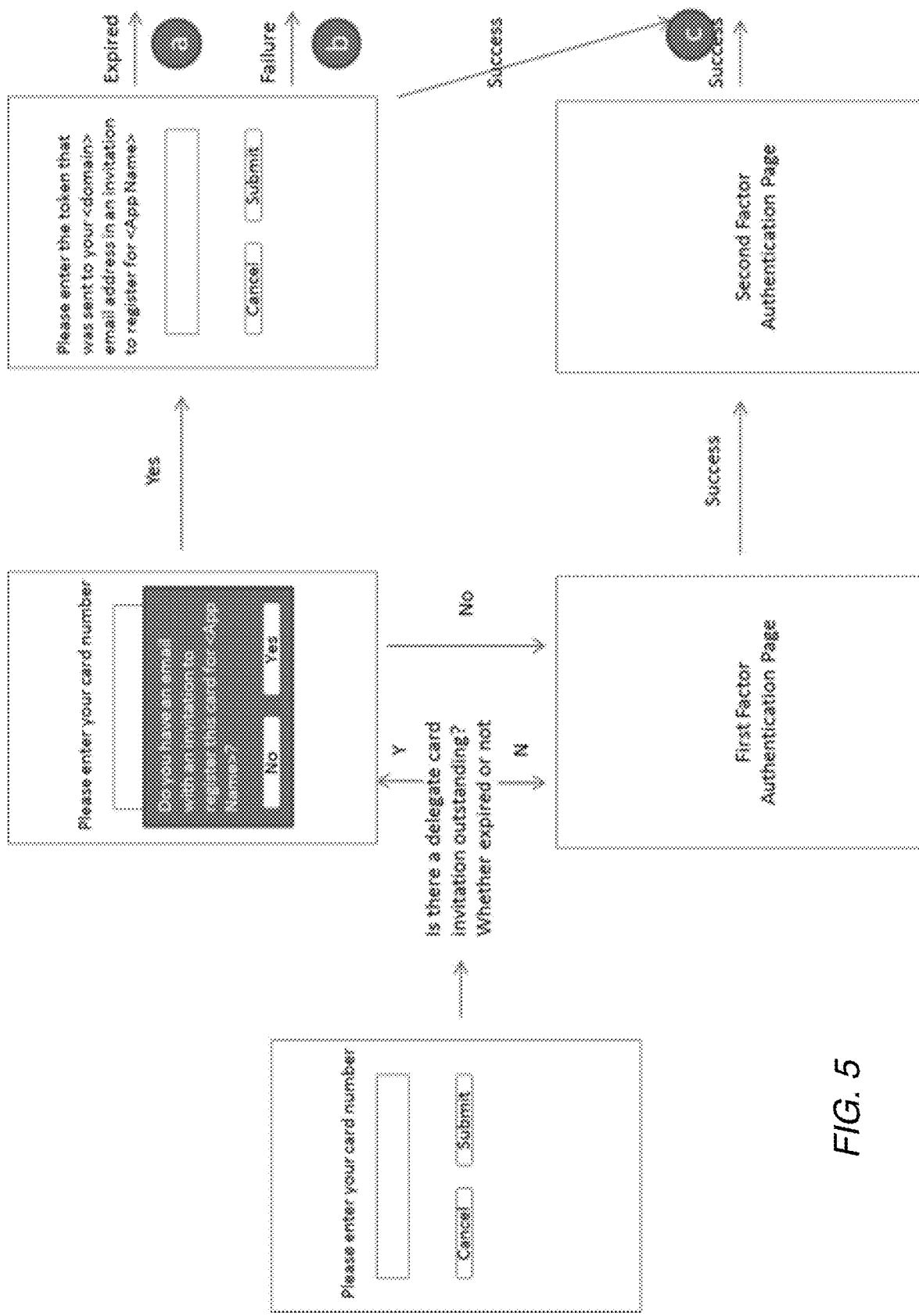
FIGS. 5-7 illustrate aspects of a registration process for delegates, in accordance with one embodiment of the invention.
Figure 6:
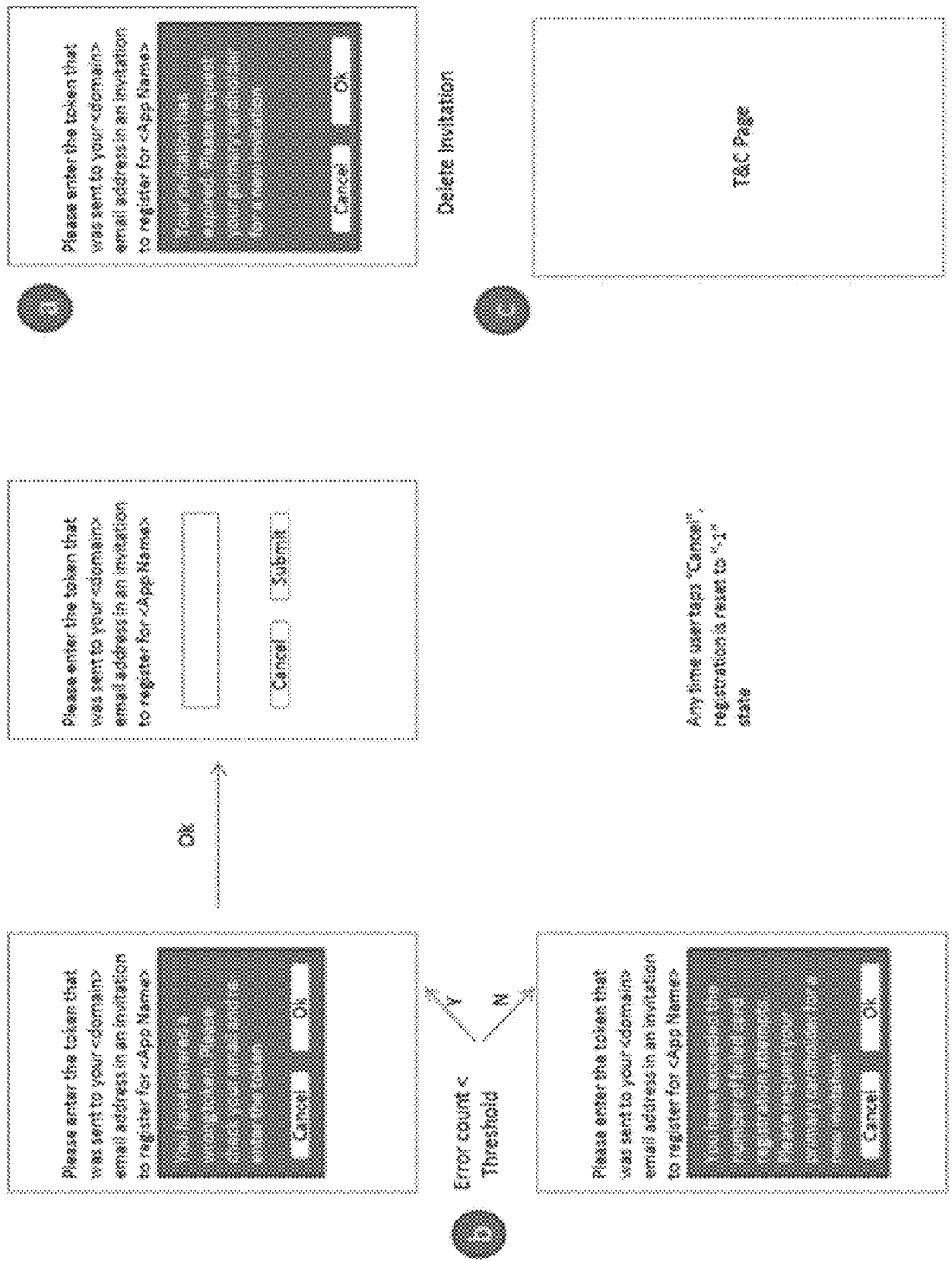
Figure 7:
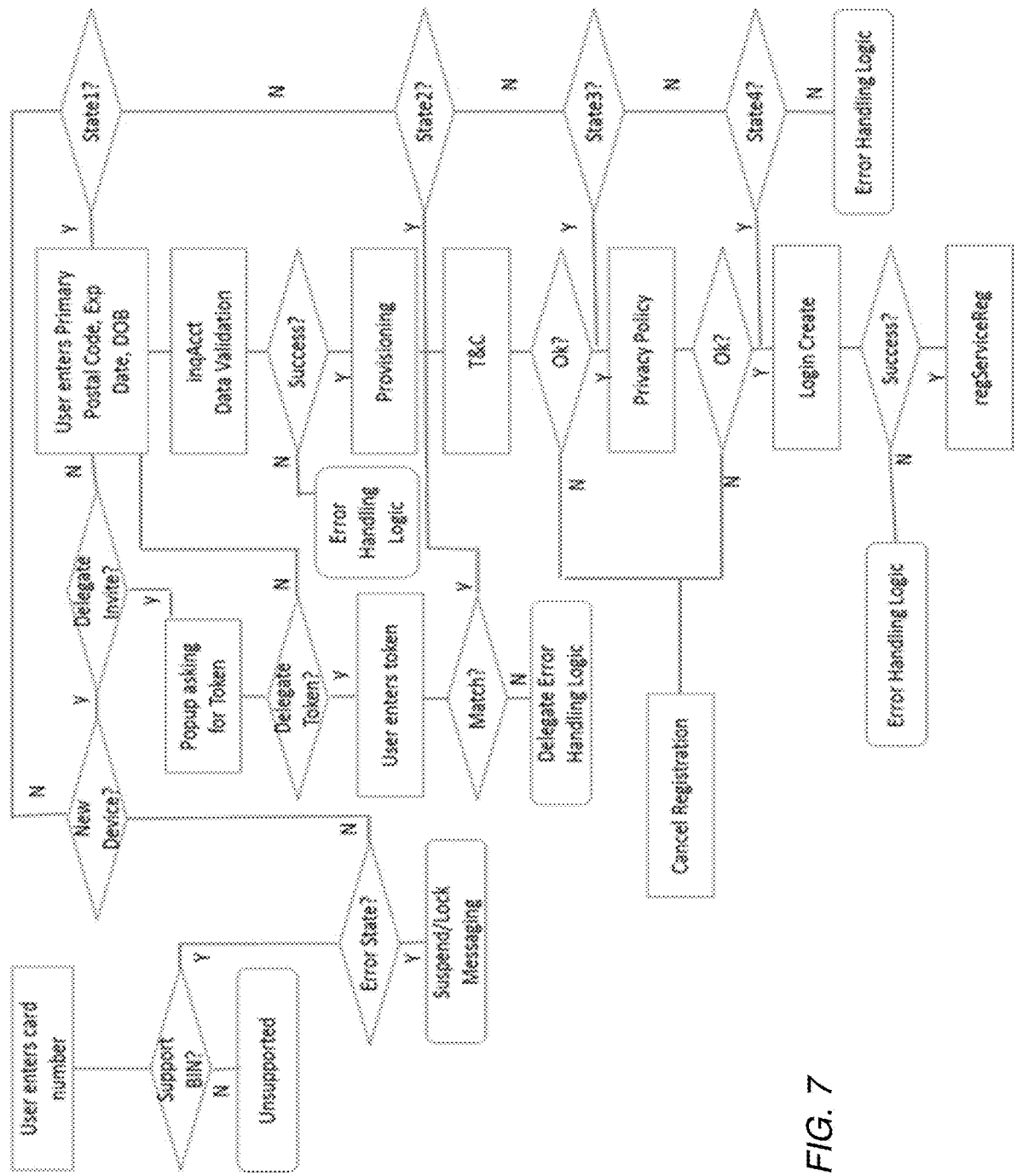

FIGS. 5-7 illustrate aspects of the registration flow for delegate dependents in a more visual format and in accordance with some embodiments.

In some embodiments, delegate token failures do not put a card in suspended or locked state. When a configured number of tries is exceeded, the invitation is deleted. In this case, the primary cardholder has to reinitiate the delegate invitation.

In one embodiment if a card is already in a suspended or locked state, a delegate cannot continue with registration.

Figure 8:
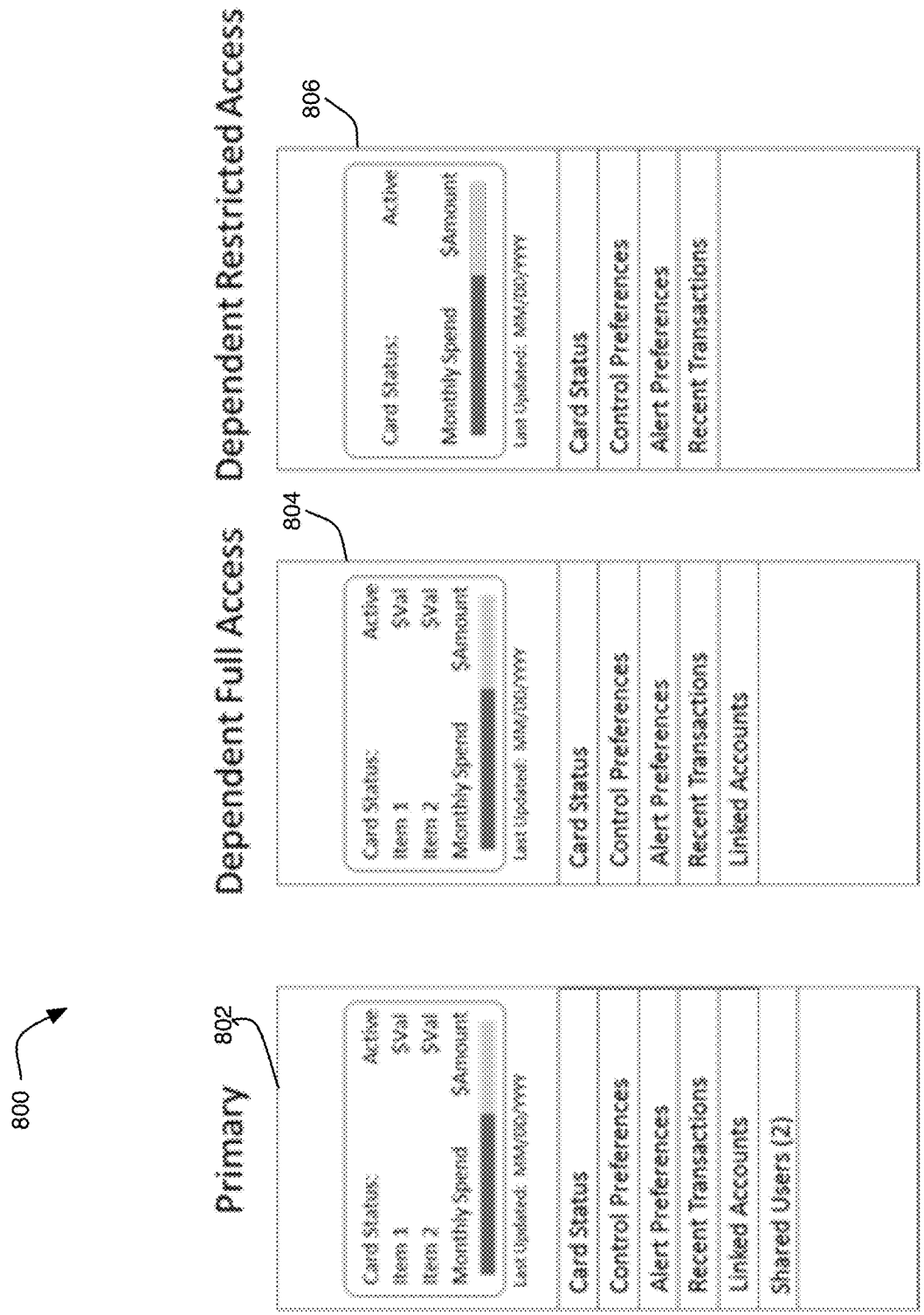
FIG. 8 shows exemplary user interfaces for primary and dependent users, in accordance with one embodiment.

Referring now to FIG. 8, reference numeral 800 show a card details views, in accordance with some embodiments. Each card details view represents a user interface associated with a display of a user (primary/delegate). Reference numeral 802 indicates the card details view for a primary user, reference numeral 804 indicates the card details view for a dependent user with full access, and reference numeral 806 indicates the card details view for the dependent user with restricted access. As will be seen, a front image of the card is identical for all primary and dependent users. Upon flipping the card image, a primary user sees all the card details, and text that shows how many additional users are managing the card; a dependent user with full access sees all the card details, and text that shows that the user is a dependent with full access. A dependent user with restricted access does not see ATM/POS limit and text that shows that the user is a dependent with restricted access.

A primary user sees all the card links, including linked accounts and shared users. A dependent user with full access sees all the card links except for shared users. A dependent user with restricted access does not see the linked accounts or shared users.

Figure 9:
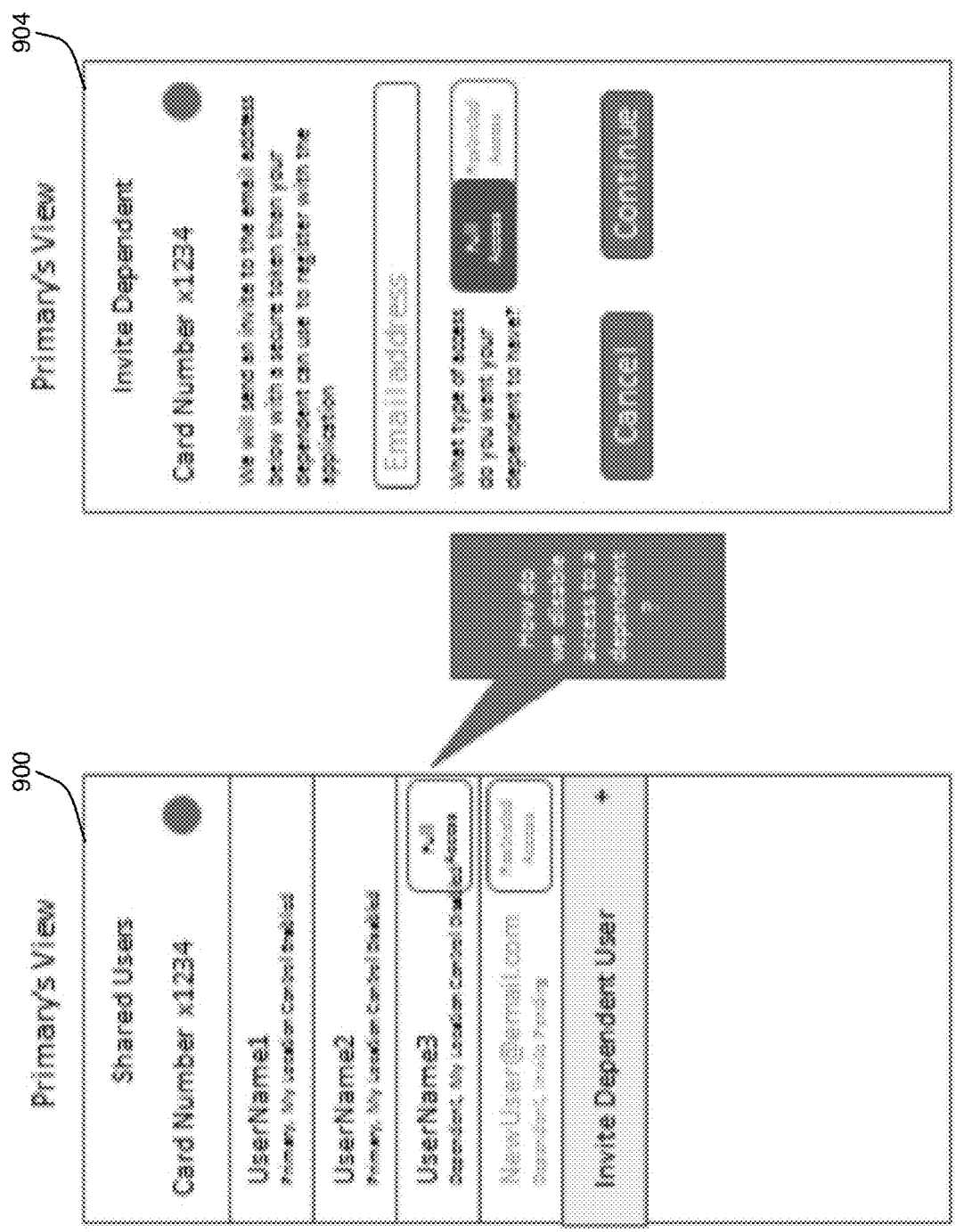
FIG. 9 shows a user interface for inviting and managing a dependent user, in accordance with one embodiment.

FIG. 9 shows a user interface 900 for inviting and managing a dependent user in accordance with one embodiment. The interface 900 is for a primary user. To access the interface 900, in one embodiment, the primary user "taps" on the "shared users" link on the interface 802. The user interface 900 shows the primary user the users who are currently managing the card. Each user is identified by a "user name", primary I dependent status, and a "my location control" status. The primary user can change the status of a dependent user from "full access" to "restricted access", and vice versa by tapping a button.

In the interface, 900 users who have been invited as dependents but have not completed their registration are identified by their email address, and a status of "invite pending". Once a dependent user completes a registration, all users are sent a notification and the status changes to the user name, dependent status, and My Location control status.

A primary user may also invite a dependent user to manage a card by tapping an "invite dependent user" link. This link takes the primary user to a page 902 that asks the primary user to enter the email address of the dependent, and the type of access—i.e. full access or restricted access. An information button provides guidance on what full and restricted access mean. Once a user taps "Continue", a one-time token is sent to the email address with instructions to download the application and use the one-time token for registration, and provides a confirmation to the user, and sends a notification to all other shared users that a new dependent has been invited to manage the card.

In one embodiment, delegate invitation entry may be removed a configured number of days after the invitation expires. It is not immediate, otherwise there is no option for a delegate to enter and know that he needs to contact the primary for another invitation. In general, for expired invitations: (a) keep the invitation for some time after it expires; (b) if delegate user enters a token, then tell the user that the invitation has expired and ask delegate to reach out to primary to get another invitation; (c) after some threshold period of time, delete the invitation When a primary user wants to create an invitation for delegate card, if there is already any invitation outstanding, then the system returns an error message stating that there is already an outstanding request.

In one embodiment, the computing server computing server 206 may be configured to parse an authorization message associated with a transaction in order to determine transaction data. The authorization message may be in electronic form and may be obtained by sniffing traffic between the card network 104 and the issuer processor 106, as is described in U.S. Ser. No. 13/781,084.

Figure 10:
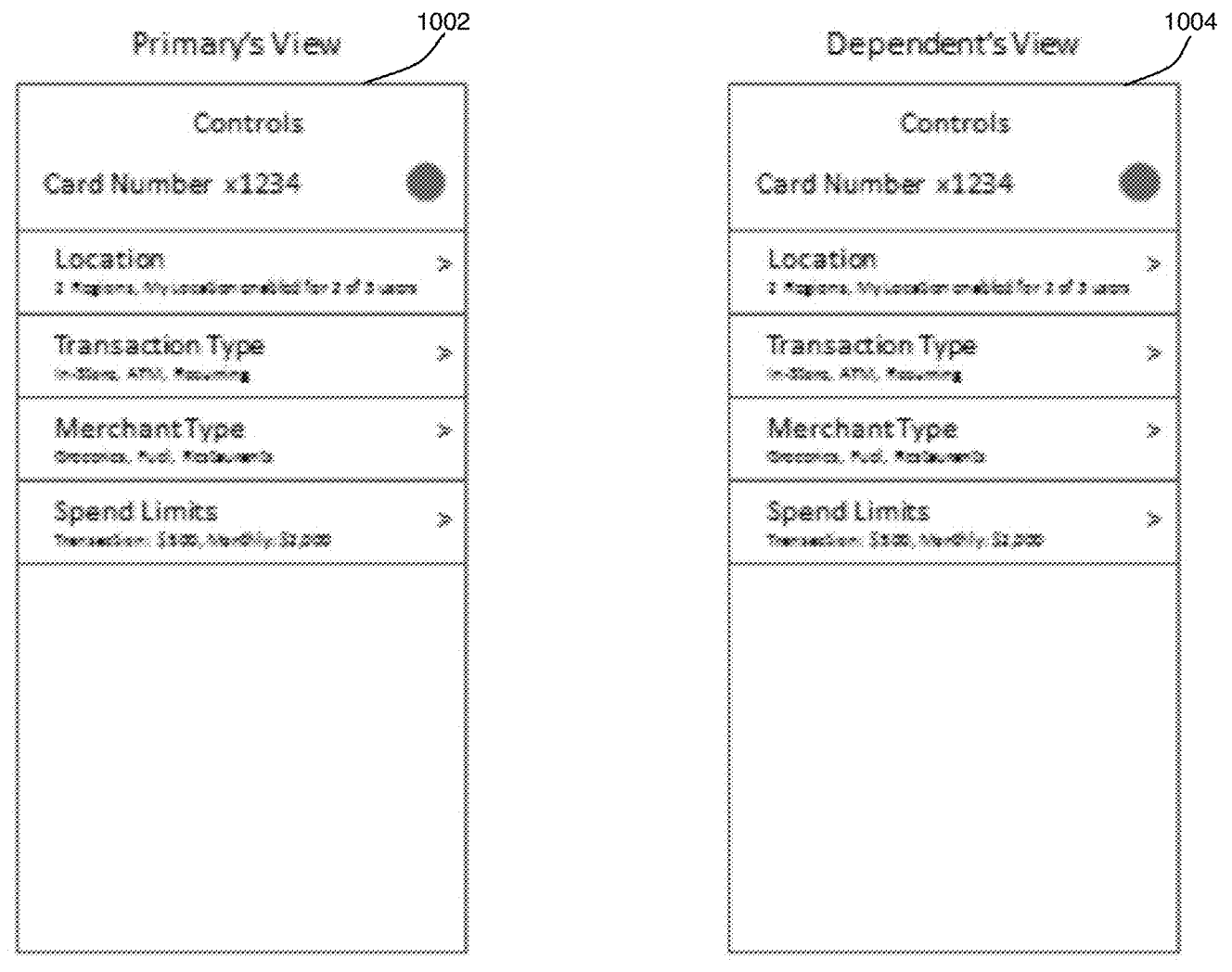

FIG. 10 shows a user interface showing the controls that may be exercised relative to a payment card. The interface 1002 is for a primary, whereas the interface 1004 is for a delegate/dependent.

Figure 11:
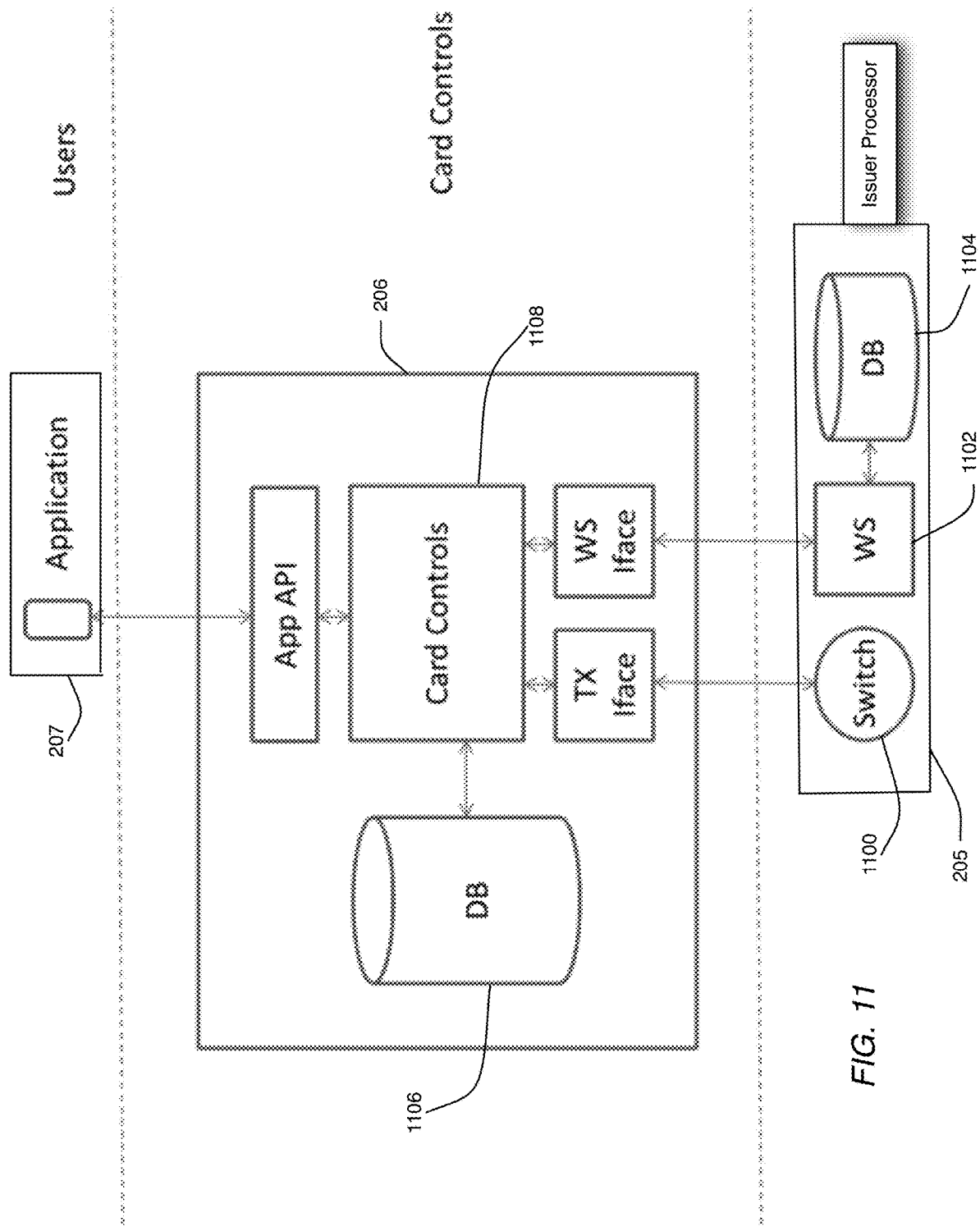
FIG. 11 shows a functional block diagram for the computing server, in accordance with one embodiment.

FIG. 11 describes an implementation of the computing server 206, in accordance with one embodiment. Referring to FIG. 11, it will be seen that the computing server 206 is communicatively coupled to an application. The application may be a client application running on a user device 207. The client application represents a mechanism for the primary user and the delegate user to access the card management system represented by the computing server 206 in order to assert access rights to a payment card as described. The user device may be mobile phone or other such device with a display the user interfaces described herein.

The issuer processor 205 may include components such as a switch 1100, a web server (WS) 1102, and a database (db) 1104.

The computing server 206 may include a database 1106 to store card transaction data for each payment card under management by the card management system. The card transaction data may be obtained form transaction authorization messages as described above. Thus, the card transaction data is obtained independently of the issuer processor 205. The computing server 206 also includes a card control module 1108 which implements functions to establish and maintain delegate card relationships as described herein.

In one embodiment, the access rights granted to a delegate may include the right to see transaction data pertaining to usage of a payment card by a primary. The access rights may also include that ability to control transactions by location; by transaction type; by merchant type; and by spend limits. For example, a primary my control card usage be a delegate by specifying allowed transaction types and/or merchant types for payment card transaction by a delegate. The primary may also set a spend limit for a registered as a delegate card.

Figure 12:
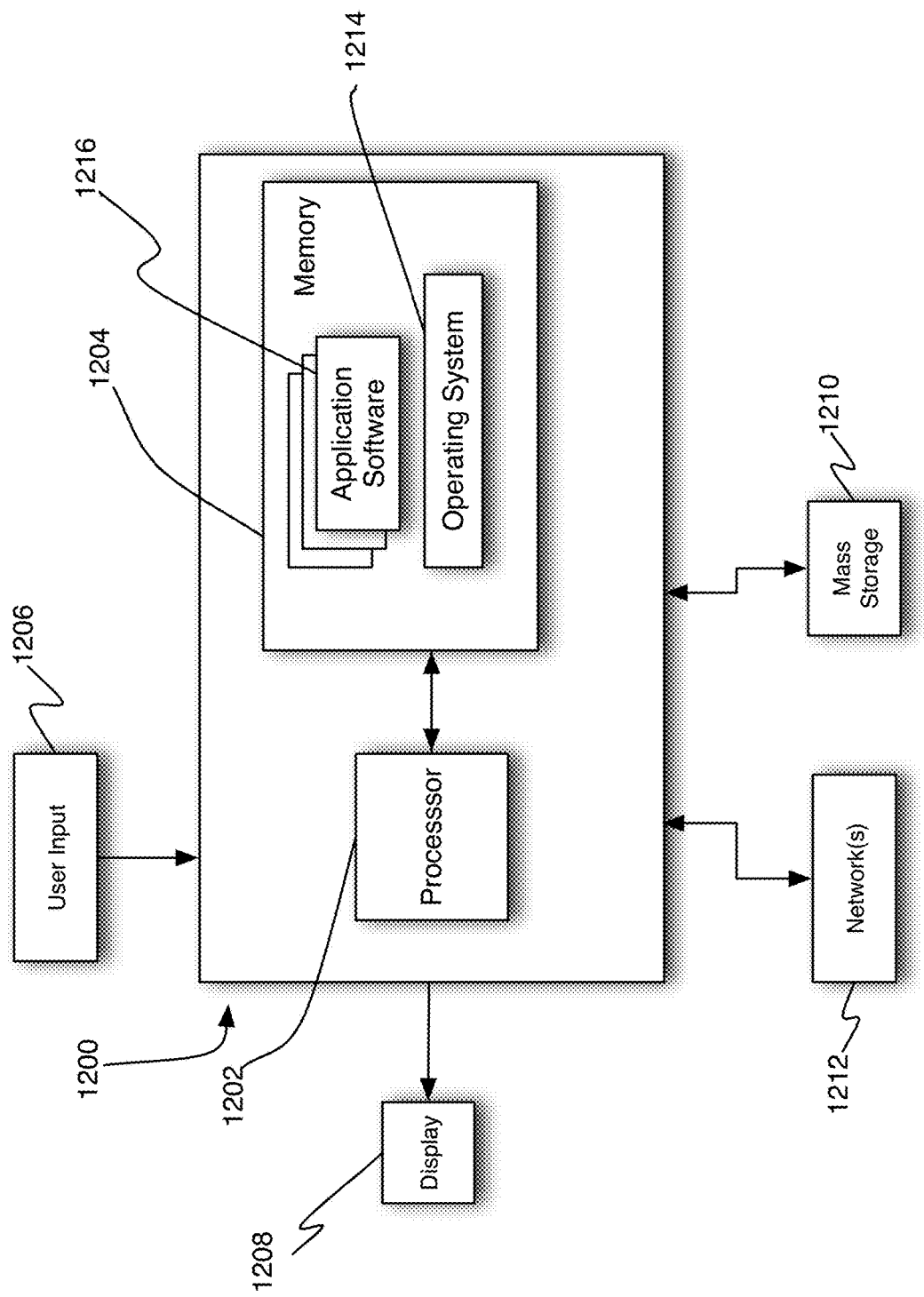
FIG. 12 shows block diagram of hardware for the computing server, in accordance with one embodiment.

FIG. 12 shows an example of hardware 1200 that may be used to implement the computing server 206 in accordance with one embodiment. The hardware 1200 may include at least one processor 1202 coupled to a memory 1204. The processor 1202 may represent one or more processors (e.g., microprocessors), and the memory 1204 may represent random access memory (RAM) devices comprising a main storage of the hardware, as well as any supplemental levels of memory e.g., cache memories, non-volatile or back-up memories (e.g. programmable or flash memories), read-only memories, etc. In addition, the memory 1204 may be considered to include memory storage physically located elsewhere in the hardware, e.g. any cache memory in the processor 1202, as well as any storage capacity used as a virtual memory, e.g., as stored on a mass storage device.

The hardware also typically receives a number of inputs and outputs for communicating information externally. For interface with a user or operator, the hardware may include one or more user input output devices 1206 (e.g., a keyboard, mouse, etc.) and a display 1208. For additional storage, the hardware 1200 may also include one or more mass storage devices 410, e.g., a Universal Serial Bus (USB) or other removable disk drive, a hard disk drive, a Direct Access Storage Device (DASD), an optical drive (e.g. a Compact Disk (CD) drive, a Digital Versatile Disk (DVD) drive, etc.) and/or a USB drive, among others. Furthermore, the hardware may include an interface with one or more networks 1212 (e.g., a local area network (LAN), a wide area network (WAN), a wireless network, and/or the Internet among others) to permit the communication of information with other computers coupled to the networks. It should be appreciated that the hardware typically includes suitable analog and/or digital interfaces between the processor 1212 and each of the components, as is well known in the art.

The hardware 1200 operates under the control of an operating system 1214, and executes application software 1216 which includes various computer software applications, components, programs, objects, modules, etc. to perform the techniques described above.

In general, the routines executed to implement the embodiments of the invention, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, USB and other removable media, hard disk drives, optical disks (e.g., Compact Disk Read-Only Memory (CD ROMS), Digital Versatile Disks, (DVDs), etc.), flash drives among others.

The invention claimed is:

1. A computer-implemented method in a card management system in a data communication network for controlling ISO (International Organization for Standardization) authorization requests initiated from transaction cards over the data communication network, the method for selectively delegating control of a transaction card for improving card security of delegation and comprising:

receiving, at a network interface of the card management system, from a first party with control of a transaction card managed by the card management system designation of at least one second party to whom control of the payment card is to be granted;

receiving, at the network interface of the card management system, input from the at least one second party to control the transaction card by the card management system, wherein the at least one second party has a subset of control delegated by the first party; and automatically asserting, by a processor unit of the card management system coupled to the network interface, control of the transaction within a transaction approval path for a specific ISO authorization request over the data communication network, based on the input received from the second party, the approval path comprising a merchant device, an acquirer processor device, a card network device, and an issuer processor device, and the control asserted at the issue processor, wherein the card issuer affects whether or not the ISO authorization request is approved, and the card issuer is unaware of the delegated control from the first party to the at least one second party.

2. The method of claim 1, wherein the control asserted by the at least one part comprises at least one of: location, transaction type, merchant type and spend limit.

* * * * *